(12) United States Patent
Sato et al.

(10) Patent No.: US 8,003,563 B2
(45) Date of Patent: Aug. 23, 2011

(54) METHOD FOR PRODUCING TUNGSTEN TRIOXIDE POWDER FOR PHOTOCATALYST, TUNGSTEN TRIOXIDE POWDER FOR PHOTOCATALYST, AND PHOTOCATALYST PRODUCT

(75) Inventors: Akira Sato, Kanagawa-Ken (JP); Kayo Nakano, Kanagawa-Ken (JP); Yasuhiro Shirakawa, Kanagawa-Ken (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 0 days.

(21) Appl. No.: 12/532,640

(22) PCT Filed: Mar. 11, 2008

(86) PCT No.: PCT/JP2008/054369
§ 371 (c)(1),
(2), (4) Date: Sep. 23, 2009

(87) PCT Pub. No.: WO2008/117655
PCT Pub. Date: Oct. 2, 2008

(65) Prior Publication Data
US 2010/0113254 A1 May 6, 2010

(30) Foreign Application Priority Data
Mar. 23, 2007 (JP) ................................. 2007-077015

(51) Int. Cl.
*B01J 23/00* (2006.01)
*C01G 37/00* (2006.01)
*C01G 39/00* (2006.01)
*C01G 41/00* (2006.01)
*C22B 34/30* (2006.01)
*C22F 3/00* (2006.01)
*C23C 22/00* (2006.01)
*C23C 8/36* (2006.01)
*C23C 14/30* (2006.01)
*B22F 1/00* (2006.01)
*H05H 1/24* (2006.01)
*H05H 1/48* (2006.01)
*H05B 7/00* (2006.01)
*H01T 14/00* (2006.01)

(52) U.S. Cl. ............ 502/305; 423/53; 148/97; 148/222; 148/513; 427/569; 427/576; 427/580; 427/596

(58) Field of Classification Search .................. 502/305; 423/53; 148/97, 222, 513; 427/569, 576, 427/580, 596
See application file for complete search history.

(56) References Cited

U.S. PATENT DOCUMENTS

| | | | | |
|---|---|---|---|---|
| 5,613,998 | A * | 3/1997 | Seegopaul et al. | 75/419 |
| 5,984,997 | A * | 11/1999 | Bickmore et al. | 75/343 |
| 6,832,735 | B2 * | 12/2004 | Yadav et al. | 241/16 |
| 6,841,142 | B1 * | 1/2005 | Tenne et al. | 423/509 |
| 2002/0016250 | A1 * | 2/2002 | Hayakawa et al. | 502/5 |
| 2005/0025700 | A1 * | 2/2005 | Bulian et al. | 423/606 |
| 2007/0177372 | A1 * | 8/2007 | Matsuda et al. | 362/97 |
| 2009/0023583 | A1 * | 1/2009 | Nakano et al. | 502/309 |
| 2010/0204040 | A1 * | 8/2010 | Nakano et al. | 502/305 |
| 2010/0204041 | A1 * | 8/2010 | Nakano et al. | 502/305 |
| 2010/0292075 | A1 * | 11/2010 | Nakano et al. | 502/177 |

FOREIGN PATENT DOCUMENTS

| | | | |
|---|---|---|---|
| JP | 61 242902 | | 10/1986 |
| JP | 2 6339 | | 1/1990 |
| JP | 4 37610 | | 2/1992 |
| JP | 9 249542 | | 9/1997 |
| JP | 2001 152130 | | 6/2001 |
| JP | 2002 293544 | | 10/2002 |
| JP | 2006 102737 | | 4/2006 |
| JP | 2008 6429 | | 1/2008 |
| WO | 2007/088891 | * | 8/2007 |

OTHER PUBLICATIONS

"Preparation and characterization of doped WO3 photocatalyst powders," M. Ashokkumar et al. Journal of Materials Science Letters 24 (1989), pp. 2135-2139.*
"Synthesis and characterization of tungsten and tungsten oxide nanostructured films," F. DiFonzo et al. Catalysis Today 116 (2006), pp. 69-73.*
"Production of photo-catalyst TiO2 and high-temperature phase WO3 ultra-fine particles by DC arc discharge," Y. Guo et al. Journal of Crystal Growth 275 (2005), pp. e2031-e2036.*
"Nanocrystalline tungsten oxide thick-films with high sensitivity to H2S at room temperature," J. L. Solis et al. Sensors and Actuators B 77 (2001), pp. 316-321.*
"Oxygen partial pressure effect on the preparation of nanocrystalline tungsten oxide powders by a plasma arc gas condensation technique," Cherng-Yuh Su et al. International Journal of Refractory Metals and Hard Materials 26 (2008), pp. 423-428.*
"Preparation of metal oxide particles by an arc plasma method," O. K. Ozawa et al. Annual Meeting of the Ceramic Society of Japan, Mar. 22, 2003, p. 40.*
"Synthesis and photocatalytic activity of WO3 nanoparticles prepared by the arc discharge method in deionized water," A. A. Ashkarran et al. Nanotechnology 19 (2008), pp. 1-7.*
Kurumada, Mami et al., "Structure of $WO_3$ ultrafine particles and their characteristic solid states", Journal of Crystal Growth, vol. 275, pp. c1673-c1678, (2005).

* cited by examiner

*Primary Examiner* — Patricia L Hailey
(74) *Attorney, Agent, or Firm* — Oblon, Spivak, McClelland, Maier & Neustadt, L.L.P.

(57) ABSTRACT

A method for producing a tungsten trioxide powder for a photocatalyst according to the present invention is characterized by comprising a sublimation step for obtaining a tungsten trioxide powder by subliming a tungsten metal powder or a tungsten compound powder by using inductively coupled plasma process in an oxygen atmosphere, and a heat treatment step for heat-treating the tungsten trioxide powder obtained in the sublimation step at 300° C. to 1000° C. for 10 minutes to 2 hours in an oxidizing atmosphere. A tungsten trioxide powder which is obtained by the method for producing a tungsten trioxide powder for a photocatalyst according to the present invention has excellent photocatalytic performance under visible light.

20 Claims, No Drawings

METHOD FOR PRODUCING TUNGSTEN TRIOXIDE POWDER FOR PHOTOCATALYST, TUNGSTEN TRIOXIDE POWDER FOR PHOTOCATALYST, AND PHOTOCATALYST PRODUCT

This application is a 371 of PCT/JP2008/054369, filed Mar. 11, 2008.

TECHNICAL FIELD

The present invention relates to a method for producing a visible light photocatalyst material, a photocatalyst material and a photocatalyst product, and particularly to a method for producing a tungsten trioxide powder for a photocatalyst, a tungsten trioxide powder for a photocatalyst and a photocatalyst product.

BACKGROUND ART

Currently, titanium oxide is often used as a photocatalyst material used for purposes such as antifouling and deodorization. In addition, photocatalyst materials are used in various areas including construction materials for outdoor use, construction materials for indoor use, and materials for household electrical appliances such as lighting equipment, refrigerators, air conditioners and toilet equipment. However, as titanium oxide is excited in the ultraviolet range, sufficient photocatalytic performance cannot be obtained in indoor areas which receive a smaller amount of ultraviolet light.

Therefore, research and development of photocatalysts having photocatalytic performance even under visible light, so-called visible light photocatalysts, has been carried out recently.

As a visible light photocatalyst, tungsten oxide is known. A technique for using tungsten oxide as a visible light photocatalyst is disclosed, for example, in Patent Document 1 (Japanese Unexamined Patent Application Publication No. 2001-152130).

With regard to the tungsten oxide as a visible light photocatalyst disclosed in Patent Document 1, a tungsten oxide film is formed on a substrate by sputtering process, and the crystal structure of the tungsten oxide is predominantly triclinic. However, the sputtering process involves exposure of substrates to high temperature. Therefore, the sputtering process cannot be applied in some cases, depending on the heat resistance temperatures of substrates. Further, sputtering operations are often performed in high-vacuum chambers or the like, and involve complicated vacuum management and processes. Therefore, there has arisen a problem that the production cost may be extremely high depending on the shapes and sizes of substrates, and a problem that it is difficult to form a film over a wide area, for example on a construction material.

On the other hand, use of tungsten oxide powder as a photocatalyst is also considered. If tungsten oxide is in powdered form, a film can be formed by mixing the powder with an organic binder such as resin and applying the mixture onto a substrate. Therefore, there is no need to expose substrates to a high temperature, and it is possible to form films on materials having a wide area such as construction materials.

As a method for producing a tungsten oxide powder, for example, there is a method for obtaining a tungsten trioxide powder by heating ammonium paratungstate (APT) in air, as described in Japanese Unexamined Patent Application Publication No. 2002-293544 (Patent Document 2). In the proposed method, a triclinic tungsten trioxide powder having a particle size of 0.010 μm (BET specific surface area is 82 m$^2$/g) is obtained by the method wherein APT is heated in air. However, the manufacturing efficiency is low because 20 hours or longer of kneading is required to stabilize the BET specific surface area.

Patent Document 1: Japanese Unexamined Patent Application Publication No. 2001-152130
Patent Document 2: Japanese Unexamined Patent Application Publication No. 2002-293544
Patent Document 3: Japanese Unexamined Patent Application Publication No. 2006-102737
Non-Patent Document 1: Journal of Solid State Chemistry, Vol. 143, No. 24, p. 32, 1999

DISCLOSURE OF INVENTION

As a method for efficiently obtaining a fine powder, for example, thermal plasma process is disclosed in Japanese Unexamined Patent Application Publication No. 2006-102737 (Patent Document 3). A fine powder of 1 nm to 200 nm is obtained by thermal plasma process.

It is true that fine powders are efficiently obtained by thermal plasma process. However, even if the fine powders are used as a photocatalyst as they are, the photocatalytic property is not necessarily satisfactory because of the following reason: though fine powders of 1 nm to 200 nm are obtained by the thermal plasma method, their average particle sizes vary widely. When a photocatalyst powder is used for a photocatalyst product, the photocatalyst product is produced by forming a film on a substrate. The film is formed by following process: mixing the photocatalyst powder with a resin binder, applying the mixture onto a substrate, and then drying the mixture. Therefore, the film contains the photocatalyst powder. Usually, in the case of a film which contains a photocatalyst powder, the photocatalyst powder exposed on the surface of the film exerts a photocatalytic effect. In such a situation, the smaller the average particle size of the photocatalyst powder is, the larger the specific surface area is, and therefore, the photocatalytic effect becomes greater accordingly. However, if the average particle size varies, there arise differences in the thickness of the film or in the asperity of the surface. Differences in the thickness of the film or in the asperity of the surface cause variations in light transmittance, and problems in the appearance such as color unevenness will arise.

In addition, there are some types of tungsten oxides such as tungsten trioxide $WO_3$, tungsten dioxide $NO_2$, WO, $W_2O_3$, $W_4O_5$, and $W_4O_{11}$. Among them, tungsten trioxide $WO_3$ is mainly used for the photocatalyst material, because it has excellent photocatalytic performance and is stable in air at normal temperature.

However, tungsten trioxide $WO_3$ has a complex crystal structure and the crystal structure is liable to change even if a small stress is applied thereto. Therefore, tungsten trioxide $WO_3$ is not stable in photocatalytic performance. Tungsten trioxide has a variety of crystal structures including monoclinic, orthorhombic, triclinic, hexagonal, cubic, and tetragonal.

For example, there is a problem that the visible light photocatalyst layer consisting of tungsten oxide disclosed in Patent Document 1 does not have sufficient capability to decompose harmful gasses such as acetaldehyde though it has excellent hydrophilic property.

Further, though the crystal structure of a tungsten trioxide $WO_3$ powder produced by heating ammonium paratungstate or the like in air is predominantly monoclinic when the tungsten trioxide $WO_3$ powder is treated for being finer and improving photocatalytic performance, the crystal structure of the tungsten trioxide $WO_3$ fine powder is transformed to predominantly triclinic due to the stress imposed by the disaggregation treatment (Journal of Solid State Chemistry, Vol. 143, No. 24, p. 32, 1999 (Non-Patent Document 1)). Furthermore, as described above, the finer the photocatalyst fine particle is, the more pronounced the effect is. However, it is difficult to reduce the size of the tungsten trioxide $WO_3$ powder particles produced by heating ammonium paratungstate or the like in the air to 100 nm or smaller, though the powder particles can be finely ground to a certain extent by the disaggregation treatment.

The present invention is made in view of the above-described situations, and is intended to provide a tungsten trioxide fine powder for a photocatalyst having high photocatalytic performance under visible light, a method for producing the same, and a photocatalyst product using the tungsten trioxide fine powder for a photocatalyst.

The method for producing a tungsten trioxide powder for a photocatalyst according to the present invention solves the problems described above, and is characterized in that it comprises a sublimation step for obtaining a tungsten trioxide powder by subliming a tungsten metal powder or a tungsten compound powder by using at least one of the following processes in an oxygen atmosphere: inductively coupled plasma process, arc discharge process, laser process and electron beam process, and a heat treatment step for heat-treating the tungsten trioxide powder obtained in the sublimation step at 300° to 1000° C. for 10 minutes to 2 hours in an oxidizing atmosphere.

In addition, the tungsten trioxide powder for a photocatalyst according to the present invention solves the problems described above, and is characterized in that it is a tungsten trioxide powder for a photocatalyst obtained by the method for producing a tungsten trioxide powder for a photocatalyst described above, wherein the tungsten trioxide powder has a BET specific surface area of 8.2 $m^2/g$ to 820 $m^2/g$.

The photocatalyst product according to the present invention solves the problems described above, and is characterized in that it comprises a substrate and a photocatalyst covering layer formed on a surface of the substrate, wherein the photocatalyst covering layer is formed by binding the tungsten trioxide powder for a photocatalyst according to claim 10 with an inorganic or organic-inorganic complex binder.

By using the method for producing a tungsten trioxide powder for a photocatalyst according to the present invention, a tungsten trioxide powder for a photocatalyst which has a small particle size and narrow particle size distribution can be produced efficiently.

Further, the tungsten trioxide powder for a photocatalyst and the photocatalyst product according to the present invention have excellent photocatalytic performance under visible light because of the small particle size and narrow particle size distribution of the tungsten trioxide powder.

BEST MODES FOR CARRYING OUT THE INVENTION

Method for Producing a Tungsten Trioxide Powder for a Photocatalyst

The method for producing a tungsten trioxide powder for a photocatalyst according to the present invention comprises a sublimation step and a heat treatment step.
(Sublimation Step)

The sublimation step is a step for obtaining a tungsten trioxide powder by subliming a tungsten metal powder or a tungsten compound powder in an oxygen atmosphere. Sublimation is a change in state of a substance from a solid phase to a vapor phase (a gas phase) or from a vapor phase to a solid phase, without passing through a liquid phase. Since a raw material powder is oxidized while being sublimed in the present invention, a fine powder of tungsten oxide is obtained.

As a tungsten compound powder used in the sublimation step, for example, tungsten oxides such as tungsten trioxide $WO_3$ and tungsten dioxide $WO_2$, tungsten carbide, ammonium tungstate, calcium tungstate, tungstic acid and the like are exemplified.

In this step, a tungsten metal powder or a tungsten compound powder is immediately changed from a solid phase to a vapor phase by conducting the sublimation step in an oxygen atmosphere, and the tungsten metal vapor which has been changed to a vapor phase is oxidized, and thereby a tungsten oxide powder is obtained. In addition, a fine powder is obtained because an oxidation reaction in a vapor phase is employed. As a tungsten metal powder or a tungsten compound powder, which is a raw material in the sublimation step, tungsten metal powder, tungsten trioxide powder, tungsten carbide powder and ammonium tungstate powder are preferable because there is less probability that impurities are contained in the tungsten trioxide powder obtained after the sublimation in an oxygen atmosphere. Among them, tungsten metal powder, tungsten trioxide powder and tungsten carbide powder are more preferable because harmful substances are not produced as by-products (substances other than tungsten trioxide) produced after the sublimation step.

Further, as a tungsten compound used as a raw material, compounds which contain tungsten (W) and oxygen (O) as their constituent elements are preferable. In the case that compounds contain W and O as their constituents, it is easier for the compounds to be immediately sublimed when inductively coupled plasma or other such process to be described below is employed in the sublimation step. As tungsten compounds containing W and O as their constituent elements, $WO_3$, $W_{20}O_{58}$, $W_{18}O_{49}$, $WO_2$, tungstic acid, APT, ammonium metatungstate and the like are exemplified.

A tungsten metal powder or a tungsten compound powder, which is a raw material in the sublimation step, has an average particle size of 0.1 to 100 μm, preferably 0.3 μm to more preferably 0.3 μm to 3 μm, still more preferably 0.3 μm to 1.5 μm. It is preferable to use a tungsten metal powder or a tungsten compound powder having the average particle size within the above described range because it is easy to conduct the sublimation. When the average particle size is smaller than 0.1 μm, the raw material powder is so fine that preadjustment of the raw material powder is necessary and the handling property is degraded, and moreover, the production cost is disadvantageously increased; therefore, it is not industrially preferable. On the other hand, when the average particle size exceeds 100 μm, it becomes difficult to cause uniform sublimation reactions. Though it is possible to cause uniform sublimation reactions when the process is conducted with a large amount of energy, it is not industrially preferable.

As a method for subliming a tungsten metal powder or a tungsten compound powder in an oxygen atmosphere in the sublimation step, at least one of the following processes is exemplified: inductively coupled plasma process, arc discharge process, laser process and electron beam process. Among them, inductively coupled plasma process and arc discharge process are preferable because it is easy to conduct an oxidation reaction in an oxygen atmosphere with the use of a large amount of raw material powder at one time. For example, in a laser process and an electron beam process, the sublimation step is conducted by irradiating a laser or an electron beam. Since the irradiation spot radius of the laser or the electron beam is small, it takes a long time to treat a large amount of raw material powder at one time. Therefore, the mass productivities in these processes are poor. By contrast, plasma process and arc discharge process are preferable. Because it is possible to control the amount of raw material which can be treated at one time by adjusting the generation fields of plasma and arc discharge, respectively.

When the sublimation in an oxygen atmosphere is conducted by the inductively coupled plasma process in the sublimation step, a method is usually used wherein plasma is generated with the use of an argon gas and an oxygen gas, and a tungsten metal powder or a tungsten compound powder is introduced into the plasma.

As a method for introducing a tungsten metal powder or a tungsten compound powder into plasma, for instance, the following methods are exemplified: a method wherein the tungsten metal powder or the tungsten compound powder is blown into the plasma together with a carrier gas, and a method wherein a dispersion obtained by dispersing the tungsten metal powder or the tungsten compound powder in a prescribed liquid dispersion medium, is blown into the plasma.

As a carrier gas used in the case where the tungsten metal powder or the tungsten compound powder is blown into the plasma, for example, air, oxygen, inert gases containing oxygen and the like are exemplified. Among them, air is preferable because of low cost. In addition, when a reaction field contains a sufficient amount of oxygen, for instance, when a reactive gas containing oxygen is blown into the plasma in addition to a carrier gas, or when the tungsten compound powder is a tungsten trioxide powder, inert gases such as argon or helium can be used as a carrier gas.

When a method in which the tungsten metal powder or the tungsten compound powder is blown into the plasma together with a carrier gas is used, it is easy to obtain a tungsten trioxide powder of which the crystal structure is constituted only by monoclinic crystal, orthorhombic crystal and triclinic crystal.

As a dispersion medium used for preparing a dispersion liquid containing the tungsten metal powder or the tungsten compound powder, a liquid dispersion medium having an oxygen atom in a molecule is used. With the use of the dispersion medium, it becomes easier to handle a raw material powder. As a liquid dispersion medium having an oxygen atom in a molecule, for example, a liquid dispersion medium containing at least one of water and alcohol at 20 vole or more is used.

As alcohol for the liquid dispersion medium, for example, at least one of alcohols selected from among methanol, ethanol, 1-propanol and 2-propanol is preferable. Water and alcohol do not interfere with sublimation reactions and oxidation reactions of raw material powders because water and alcohol are easily volatilized by the heat of plasma, and it is easy to promote oxidation reactions because water and alcohol contain oxygen in their molecules.

A tungsten metal powder or a tungsten compound powder is dispersed in the above-described dispersion medium to prepare the dispersion liquid.

The tungsten metal powder or the tungsten compound powder is contained in the dispersion at 10 mass % to 95 mass %, preferably at 40 mass % to 80 mass %. When the content of the tungsten metal powder or the tungsten compound powder in the dispersion is within the above-described range, the tungsten metal powder or the tungsten compound powder is dispersed in the dispersion uniformly. It is preferable that the raw material powder is uniformly dispersed because it is easy to uniformly conduct the sublimation reaction of the raw material powder. When the content of the tungsten metal powder or the tungsten compound powder in the dispersion is less than 10 mass %, the amount of the raw material powder so small that efficient production is impossible. On the other hand, when the content exceeds 95 mass %, the dispersion is likely to stick to a container because the viscosity of the raw material powder increases due to the small amount of the dispersion, and therefore, it becomes even more difficult to handle the dispersion.

The method which uses the dispersion thus described can be applied to arc discharge process as well.

When a method is used wherein the tungsten metal powder or the tungsten compound powder is prepared to be the above-described dispersion and blown into the plasma, it is easy to obtain a tungsten trioxide powder of which the crystal structure is constituted by only monoclinic crystal and orthorhombic crystal.

In addition, in the case where the sublimation step is conducted by performing irradiation with a laser or an electron beam, it is preferable to use a pelletized tungsten metal or tungsten compound because of the following reason. Since the irradiation spot diameter of the laser or the electron beam is small, use of the tungsten metal powder or the tungsten compound powder will result in great difficulty in supply of such powders. However, when a pelletized tungsten metal or tungsten compound is used, efficient sublimation is possible. Further, when pellets, a laser beam or an electron beam is moved during the irradiation performed with the laser or the electron beam, the entire surface of pellets of a certain size can be efficiently sublimed. Consequently a tungsten trioxide powder constituted by monoclinic crystal, triclinic crystal and orthorhombic crystal can be obtained. The method which uses pellets as described above can be applied also to a case wherein inductively coupled plasma process is used, and a case wherein arc discharge process is used.

There is no particular requirement for the laser process as long as the laser has sufficient energy to sublime a tungsten metal and a tungsten powder. However, a $CO_2$ laser is preferable because it has higher energy.

(Heat Treatment Step)

The heat treatment step is a step for heat-treating the tungsten trioxide powder obtained in the sublimation step at a prescribed temperature for a prescribed time in an oxidizing atmosphere. By conducting the heat treatment step, it becomes possible to increase the percentage of the tungsten trioxide fine powder in the tungsten oxide fine powder to 99% or more, substantially to 100%. Further, the crystal structure of the tungsten trioxide can be adjusted by the heat treatment step such that it has a prescribed structure.

As an oxidizing atmosphere used in the heat treatment step, for example, air or an oxygen-containing gas is used. The oxygen-containing gas herein described means an inert gas containing oxygen.

The temperature of the heat treatment in the heat treatment step is 300° C. to 1000° C., preferably 500° C. to 700° C. The time for the heat treatment in the heat treatment step is 10 minutes to 2 hours, preferably 30 minutes to 1.5 hours. It is preferable that the temperature and the time for the heat treatment are set within the above-described ranges because it is easy to produce tungsten trioxide from a tungsten oxide other than tungsten trioxide. When the temperature is less than 300° C., the oxidation effect for changing powders, which were not changed to tungsten trioxide in the sublimation step, to tungsten trioxide, is small. On the other hand, it is not preferable that the temperature exceeds 1000° C. because tungsten oxide fine particles show rapid grain growth. By conducting the heat treatment step, the crystal structure of the tungsten trioxide fine powder can be adjusted.

Tungsten Trioxide Powder for a Photocatalyst

The tungsten trioxide powder for a photocatalyst according to the present invention is a powder obtained by the above-described method for producing a tungsten trioxide powder for a photocatalyst according to the present invention.

The tungsten trioxide powder for a photocatalyst according to the present invention has an average particle size converted from a BET specific surface area of 1 nm to 100 nm, preferably 10 nm to 100 nm, more preferably 15 nm to 100 nm.

Further, as for the tungsten trioxide powder for a photocatalyst according to the present invention, a particle size distribution is within a range of 0.3 to 2 in terms of (D90-D10)/D50 obtained by image analysis.

The particle size distribution (D90-D10)/D50 is a parameter calculated by the following method. First, a close up photograph of a powder taken with SEM or TEM is subjected to image analysis to extract 150 or more grains of the powder, and a volume-based cumulative diameter (volume ratio) is calculated. The value of (D90-D10)/D50, calculated from D90, D50, D10 obtained by the above calculation, is defined as a particle size distribution. The particle size distribution (D90-D10)/D50 shows that the closer to 1 the value is, the more uniform the particle size is.

In addition, D50 of the tungsten trioxide powder for a photocatalyst according to the present invention is preferably 1 nm to 100 nm, more preferably 10 nm to 100 nm.

Further, the tungsten trioxide powder for a photocatalyst according to the present invention predominantly has any one or more types of the following crystal structures: monoclinic crystal, orthorhombic crystal and triclinic crystal.

The crystal structure herein described means a crystal structure determined by an X-ray diffraction method. In the X-ray diffraction method, crystal structures are determined as follows: peaks obtained by the X-ray diffraction are checked against JCPDS cards, and when there is a corresponding peak, the presence of the crystal structure is recognized. Further, when peaks of two or more crystal structures are observed by the X-ray diffraction, it is regarded that the "predominant" crystal structure of the crystal structures is a crystal structure having the highest peak intensity. The card numbers of JCPDS cards used for the determination of crystal structures are as follows.
Types of JCPDS cards
Monoclinic crystal: 43-1035
Orthorhombic crystal: 20-1324
Triclinic crystal: either 20-1323 or 32-1395
Cubic crystal: 41-0905
Tetragonal crystal: 05-0388
Hexagonal crystal: 33-1387

In addition, it is preferable that the tungsten trioxide powder for a photocatalyst according to the present invention has at least two types of crystal structures selected from monoclinic, orthorhombic and triclinic. Further, it is more preferable that the tungsten trioxide powder for a photocatalyst according to the present invention only has at least two types of crystal structures selected from monoclinic, orthorhombic and triclinic, because the photocatalytic performance is high. As the photocatalytic performance described herein, for example, a performance for the decomposition of organic gases such as acetaldehyde is exemplified.

Further, it is more preferable that the tungsten trioxide powder for a photocatalyst according to the present invention has a crystal structure constituted only by monoclinic crystal, orthorhombic crystal and triclinic crystal, or a crystal structure constituted only by monoclinic crystal and triclinic crystal, because the photocatalytic performance improves further.

It is preferable that the tungsten trioxide powder for a photocatalyst according to the present invention has the larger average particle size within the above-described range. The larger the average particle size is, the higher the photocatalytic performance shows.

The tungsten trioxide powder for a photocatalyst according to the present invention usually has a BET specific surface area of 8.2 $m^2/g$ to 820 $m^2/g$, preferably 20 $m^2/g$ to 820 $m^2/g$.

It is preferable that the tungsten trioxide powder for a photocatalyst according to the present invention has the latter BET specific surface area. In other words, the larger the BET specific surface area is, the more preferable it is, because the photocatalytic performance improves accordingly.

The tungsten trioxide powder for a photocatalyst according to the present invention may be a mixed powder, which is made of a particular tungsten trioxide powder having the above-described crystal structure, particle size and optionally BET specific surface area, and a tungsten trioxide powder having a physical property other than the physical property thus described.

In the tungsten trioxide powder for a photocatalyst consisting of the mixed powder, the above-described particular tungsten trioxide powder is contained usually at 90 mass % or more, preferably at 95 mass % or more, and more preferably at 99 mass % to 99.9 mass %.

It is preferable that the tungsten trioxide powder for a photocatalyst according to the present invention has the higher rate of content of the above-described particular tungsten trioxide powder within the above-described range. The higher the rate of content of the tungsten trioxide powder is, the higher the photocatalytic performance shows.

Photocatalyst Products

The photocatalyst product according to the present invention is a product that comprises a substrate and a photocatalyst covering layer formed on a surface of the substrate. In addition, a barrier layer may be formed between the substrate and the photocatalyst covering layer.

As a substrate of the photocatalyst product according to the present invention, for example, glass, ceramics, concrete, metals, resins including acryl, wood, fibers and the like are used. Further, a shape of the substrate is not particularly limited, and the substrate may have a variety of shapes including plate-like ones, bar-like ones and fibrous ones. In addition, for example, when the photocatalyst is applied to construction materials, the outer or inner walls of buildings can be used as a substrate as they are, when the photocatalyst product is applied to lighting equipment, the exterior or interior of the lighting equipment can be used as a substrate as is, and when the photocatalyst product is applied to deodorizing equipment, an air passage can be used as a substrate as is.

It is preferable that the photocatalyst covering layer of the photocatalyst product according to the present invention is a layer formed by binding the above-described tungsten trioxide powder for a photocatalyst according to the present invention with an inorganic or organic-inorganic complex binder.

As the inorganic binder, for instance, colloidal silica, alumina sol, zirconia sol or the like are used. The inorganic binder transforms into silica, alumina, zirconia or the like in the photocatalyst covering layer, and binds the grains of the tungsten trioxide powder for a photocatalyst according to the present invention to one another. Therefore, the grains of the tungsten trioxide powder for a photocatalyst according to the present invention become firmly fixed on the surface of the substrate.

The organic-inorganic complex binder means organic substance containing a metal element such as Si as a constituent. As the organic-inorganic complex binder, silicone resin and the like are exemplified. Organic substance which does not contain a metal element, for example, epoxy resin, is not preferable because of being degraded by the tungsten trioxide powder.

In addition, if necessary, a barrier layer may be provided between the substrate and the photocatalyst covering layer. The barrier layer is used, for instance, in the case where the substrate is a material which may be degraded by the photocatalytic effect, such as resin, fiber, or wood. When target organic substance is decomposed by the photocatalytic effect, sometimes substrates such as resin substrates are degraded at the same time. However, by forming a layer made only of an inorganic binder or an organic-inorganic complex binder as a barrier layer under the photocatalyst covering layer, it becomes possible to prevent degradation of the substrate. Further, it is also possible to impart a role of an adhesion layer to the barrier layer.

The photocatalyst covering layer has a thickness of, usually 0.1 µm to 3 µm, preferably 0.5 µm to 2 µm.

With regard to the photocatalyst covering layer, only the photocatalyst powder exposed from the binder, that is, only the photocatalyst powder in contact with air exerts the photocatalytic effect. However, it is not preferable that the thickness of the photocatalyst covering layer is less than 0.1 µm because there is a risk that sufficient joint strength (bonding strength) between the layer and the substrate cannot be exerted. On the other hand, it is not preferable that the thickness of the photocatalyst covering layer exceeds 5 µm because there is a risk that the photocatalyst covering layer may crack.

Therefore, it is preferable that the photocatalyst covering layer has the thickness range of, 0.1 µm to 5 µm, 0.5 µm to 4 µm, or 1 µm to 3 µm, in ascending order of preference, because the balance between the high levels of the photocatalytic performance and the translucency improves accordingly.

The photocatalyst covering layer contains usually 10 vol % or more of, preferably 30 vol % to 80 vol % of the tungsten trioxide powder for a photocatalyst according to the present invention.

It is not preferable that the content of the above-described particular tungsten trioxide powder for a photocatalyst in the photocatalyst covering layer is less than 10 vol % because the level of the photocatalytic performance is not sufficiently high. On the other hand, in the case where the content exceeds 80 vol %, there is a risk that the joint strength between the layer and the substrate decreases because of the large amount of the photocatalyst powder. In that case, it is also possible to add an adhesion layer to maintain the strength. The joint strength between the layer and the substrate is adjusted in accordance with the use environment.

The photocatalyst covering layer showing the above-described values of thickness and vol % exhibits high translucency. Specifically the photocatalyst covering layer showing the above-described values of thickness and vol % exhibits high transmittance for light having a wavelength of 550 nm is 50% or more. The light having a wavelength of 550 nm is chosen because at the wavelength, an amount of the light absorbed by the tungsten trioxide powder is small, so that the transmittance of the photocatalyst covering layer itself can be measured. A part of the photocatalyst covering layer exhibiting low transmittance will cause reflection etc., which will lead to disadvantages in appearance such as color unevenness. Therefore, it will cause a problem particularly when the photocatalyst covering layer is applied to visible materials such as construction materials, lighting equipment, and the like. The photocatalyst product according to the present invention is useful in areas where appearance is important such as construction materials, lighting equipment and the like.

In addition, regarding the photocatalyst product according to the present invention, visible light can be used as an excitation source for the photocatalyst product. Visible light has a wavelength range of 390 to 830 nm. The tungsten trioxide powder for a photocatalyst according to the present invention exhibits an excellent photocatalytic effect especially when light having a wavelength of 430 to 500 nm is irradiated. As an excitation source which emits light having a wavelength of 430 to 500 nm, sunlight, fluorescent light, a blue light emitting diode, a blue laser and the like are exemplified. The blue light emitting diode and the blue laser are particularly preferable because they can emit only light having a wavelength of 430 to 500 nm.

EXAMPLES

Examples will be described below. However, the present invention should not be construed as limited to these.

Example 1

A tungsten trioxide powder having an average particle size of 0.5 µM was prepared as a raw material powder. In the sublimation step, this raw material powder was sprayed into RF plasma such that the average flow rate was adjusted to be 1 m/s while using the atmosphere (air) as a carrier gas, and the raw material powder was sublimed while being subjected to an oxidation reaction. Consequently a tungsten trioxide powder was obtained through the sublimation step.

Next, the heat treatment step was conducted under the air atmosphere at 530° C.×1 hour on the obtained tungsten trioxide powder. Thereby a tungsten trioxide powder for a photocatalyst was obtained.

For the obtained tungsten trioxide powder for a photocatalyst, BET specific surface area, particle size distribution, and crystalline phase were measured. As a parameter of the particle size distribution, the value of (090-D10)/D50, calculated from D90, D50 and D10 obtained by calculating a cumulative diameter for 150 or more grains by image analysis, was used. The crystalline phase was determined by measuring an X-ray chart obtained by XRD analysis and checking the measurement result against the JCPDS cards described above.

The measurement results were as follows: the BET specific surface area was 41 $m^2/g$, the average particle size converted from the BET specific surface area was 20 nm, and the particle size distribution (D90-D10)/D50 was 0.9. Further, it was found that the crystalline phase was constituted only of monoclinic crystal, orthorhombic crystal and triclinic crystal.

Example 2

A tungsten metal powder having an average particle size of 1 µm was prepared as a raw material powder. In the sublimation step, this raw material powder was sprayed into RF plasma such that the average flow rate was adjusted to be 2 m/s while using atmosphere (air) as a carrier gas, and the raw material powder was sublimed while being subjected to an oxidation reaction. Consequently a tungsten trioxide powder was obtained through the sublimation step.

Next, the heat treatment step was conducted under the air atmosphere at 600° C.×2 hours on the obtained tungsten trioxide powder. Thereby a tungsten trioxide powder for a photocatalyst was obtained.

For the obtained tungsten trioxide powder for a photocatalyst, the same measurement as described in Example 1 was conducted, and the following results were obtained: the BET specific surface area was 14 m$^2$/g, and the particle size distribution (D90-D10)/D50 was 0.93. Further, it was found that the crystalline phase was constituted only by monoclinic crystal, orthorhombic crystal and triclinic crystal.

Example 3

A tungsten metal powder having an average particle size of 2 μm was prepared as a raw material powder. In the sublimation step, this raw material powder was mixed with water to prepare a dispersion liquid, and the dispersion was sprayed into RF plasma such that the average flow rate was adjusted to be 0.5 m/s while using the atmosphere (air) as a carrier gas. The raw material powder was sublimed while being subjected to an oxidation reaction, and a tungsten trioxide powder was obtained through the sublimation step.

Next, the heat treatment step was conducted under the air atmosphere at 550° C.×30 minutes on the obtained tungsten trioxide powder. Thereby a tungsten trioxide powder for a photocatalyst was obtained.

For the obtained tungsten trioxide powder for a photocatalyst, the same measurement as described in Example 1 was conducted, and the following results were obtained: the BET specific surface area was 68 m$^2$/g, and the particle size distribution (D90-D10)/D50 was 0.88. Further, it was found that the crystalline phase was constituted only by monoclinic crystal, orthorhombic crystal and triclinic crystal.

Examples 4 to 13

Next, the same measurement as described in Example 1 was conducted for products of which production conditions were changed as shown in Table 1.

Comparative Example 1

A product which is prepared in the same manner as described in Example 1 until the end of the sublimation step but is not subjected to the heat treatment step, is defined as Comparative Example 1.

Comparative Example 2

By heating an ammonium paratungstate powder under the air atmosphere, a tungsten oxide powder was prepared. The obtained tungsten oxide powder was put into an alumina mortar, and ground and kneaded for 25 hours while water was sprayed. The resultant product is defined as Comparative Example 2.

Comparative Examples 3 and 4

Products prepared in a manner as described in Example 1, except that the temperature of the heat treatment step was 200° C. and 1300° C. are defined as Comparative Examples 3 and 4, respectively.

TABLE 1

| | Raw Material Powder Average Particle Size (μm) | Sublimation Step | | Heat Treatment Step | | |
|---|---|---|---|---|---|---|
| | | Dispersion Liquid | Method | Atmosphere | Temperature (° C.) | Time |
| Example 1 | WO$_3$(0.5) | None | RF Plasma | Air | 530 | 1 Hour |
| Example 2 | W(1) | None | RF Plasma | Air | 600 | 2 Hours |
| Example 3 | W(2) | Water | RF Plasma | Air | 550 | 30 Minutes |
| Example 4 | WC(1) | Alcohol | RF Plasma | Air | 500 | 1.5 Hours |
| Example 5 | WO$_3$(0.1) | Alcohol | RF Plasma | Air | 670 | 1.5 Hours |
| Example 6 | WO$_3$(0.3) | Water | Arc | Air | 550 | 1 Hour |
| Example 7 | WO$_3$(3) | Water | RF Plasma | Air | 530 | 1 Hour |
| Example 8 | WO$_3$(10) | None | RF Plasma | Air | 320 | 1 Hour |
| Example 9 | WO$_3$(50) | None | RF Plasma | Air | 600 | 1 Hour |
| Example 10 | WO$_3$(90) | Water | RF Plasma | Air | 900 | 30 Minutes |
| Example 11 | WO$_3$(200) | Water | RF Plasma | Air | 700 | 1 Hour |
| Example 12 | W(5) | — | Laser | Air | 650 | 2 Hours |
| Example 13 | W(3) | — | Electron Beam | Air | 600 | 2 Hours |
| Comparative Example 1 | WO$_3$(0.5) | None | RF Plasma | — | — | — |
| Comparative Example 2 | — | — | — | — | — | — |
| Comparative Example 3 | WO$_3$(0.5) | None | RF Plasma | Air | 200 | 1 Hour |
| Comparative Example 4 | WO$_3$(0.5) | None | RF Plasma | Air | 1300 | 1 Hour |

TABLE 2

| | Tungsten Trioxide Powder | | | |
|---|---|---|---|---|
| | BET Specific Surface Area (m²/g) | Average Particle Size (nm) | Particle Size Distribution | Crystalline Phase |
| Example 1 | 41 | 20 | 0.90 | Monoclinic, Orthorhombic, Triclinic |
| Example 2 | 14 | 60 | 0.93 | Monoclinic, Orthorhombic, Triclinic |
| Example 3 | 68 | 12 | 0.88 | Monoclinic, Orthorhombic, Triclinic |
| Example 4 | 46 | 18 | 0.90 | Monoclinic, Orthorhombic, Triclinic |
| Example 5 | 13 | 62 | 1.20 | Monoclinic, Orthorhombic, Triclinic |
| Example 6 | 42 | 20 | 0.92 | Monoclinic, Orthorhombic, Triclinic |
| Example 7 | 41 | 20 | 0.91 | Monoclinic, Orthorhombic, Triclinic |
| Example 8 | 55 | 15 | 0.87 | Monoclinic, Orthorhombic, Triclinic |
| Example 9 | 21 | 40 | 1.11 | Monoclinic, Orthorhombic, Triclinic |
| Example 10 | 12 | 70 | 1.22 | Monoclinic, Triclinic |
| Example 11 | 10 | 85 | 1.02 | Monoclinic, Triclinic |
| Example 12 | 18 | 45 | 0.97 | Monoclinic, Orthorhombic, Triclinic |
| Example 13 | 21 | 40 | 1.03 | Monoclinic, Orthorhombic, Triclinic |
| Comparative Example 1 | 46 | 18 | 0.87 | Monoclinic, Orthorhombic, Triclinic |
| Comparative Example 2 | 4.3 | 190 | 2.50 | Triclinic |
| Comparative Example 3 | 45 | 18 | 0.87 | Monoclinic, Orthorhombic, Triclinic |
| Comparative Example 4 | 3.6 | 230 | 1.10 | Monoclinic |

As described above, it is found that the tungsten trioxide powder obtained by the method according to the present Example has a fine particle size and a small particle size distribution.

Examples 14 to 20, Comparative Examples 5 to 9

Further, for the obtained photocatalyst fine powder of tungsten trioxide, acetaldehyde decomposition capability and transmittance were measured by the following method.

(Method for Examining Acetaldehyde Decomposition Capability)
(Measuring Apparatus)

First, a highly air-tight transparent Pyrex® glass container having a gas inlet and a gas outlet, and an internally located fan, was prepared as a reaction container.

Next, the gas inlet and the gas outlet of this glass container were connected with a fluorine resin tube such that a gas could circulate through the glass container and the tube. In addition, a gas monitor was mounted in the middle of the tube such that the concentration of the gas that circulated through the tube could be measured.

Further, an LED, which emits a blue light having a peak wavelength of 460 nm to the inside of the glass container, was disposed outside the glass container. As a result, the measuring apparatus for measuring acetaldehyde decomposition capability was thus completed.

(Measurement of Acetaldehyde Decomposition Capability)

First, a glass dish was placed in the glass container of the above-described measuring apparatus, and 1 g of sample powder was placed on the glass dish. Next, an acetaldehyde gas was charged into the measuring apparatus at a concentration of 20 ppm. Subsequently the measuring apparatus was hermetically sealed, the fan was driven, a mixed gas consisting of air and the acetaldehyde gas was circulated through the glass container and the tube in the measuring apparatus. Further, by the emission of the above-described LED, a blue light having a peak wavelength of 460 nm was irradiated to the sample powder on the glass dish at an intensity of 1 mW/cm². The measuring apparatus was continuously operated under that condition, and the acetaldehyde gas concentrations (residual amount of acetoaldehyde) in the gas that circulated inside the measuring apparatus were measured sequentially with a multigas monitor.

(Method for Measuring Transmittance)
(Preparation of Measurement Samples)

As a substrate, a glass substrate was prepared. The tungsten trioxide powder for a photocatalyst according to each Example or Comparative Example and a silicone resin were mixed to prepare a photocatalyst paste. Then, the photocatalyst paste was applied onto the glass substrate and dried to form a photocatalyst covering layer.

(Measurement of Transmittance)

Light having a wavelength of 550 nm was irradiated with the use of a UV-Vis spectrophotometer (Shimadzu Corporation (trade name: UV-2550)), and the light transmittance was measured.

The results are shown in Tables 3 and 4.

TABLE 3

| | Tungsten Trioxide Powder for Photocatalyst | Photocatalytic Performance excited by Blue LED Residual Amount of Acetoaldehyde (ppm) |
|---|---|---|
| Example 14 | Example 1 | 3 |
| Example 15 | Example 2 | 7 |
| Example 16 | Example 3 | 2 |
| Comparative Example 5 | Comparative Example 1 | 18 |
| Comparative Example 6 | Comparative Example 2 | 19 |
| Comparative Example 7 | Comparative Example 3 | 18 |
| Comparative Example 8 | Comparative Example 4 | 17 |

TABLE 4

| | Tungsten Trioxide Powder for Photocatalyst | Photocatalyst Covering Layer | | |
|---|---|---|---|---|
| | | Filling Rate (vol %) | Thickness of Layer (μm) | Transmittance (%) |
| Example 17 | Example 1 | 75 | 0.25 | 93 |
| Example 18 | Example 1 | 75 | 0.5 | 86 |
| Example 19 | Example 1 | 75 | 0.75 | 77 |
| Example 20 | Example 1 | 75 | 1.0 | 70 |
| Comparative Example 9 | Comparative Example 4 | 75 | 1.0 | 36 |

The tungsten trioxide powder for a photocatalyst according to the present Example is excellent in terms of acetaldehyde decomposition capability. Further, the photocatalyst covering layer has a high transmittance, and therefore, problems such as color unevenness are less likely to occur optically. Accordingly, it can be said that the tungsten trioxide powder for a photocatalyst according to the present Example is effective when used for appearance of construction materials and the like.

The invention claimed is:

1. A method for producing a tungsten trioxide powder comprising:
subliming a tungsten metal powder or a tungsten compound powder by at least one of the following processes in an oxygen atmosphere to produce a tungsten oxide powder:
an inductively coupled plasma process,
an arc discharge process,
a laser process, and
an electron beam process; and
heat-treating the tungsten oxide powder at 300° C. to 1000° C. for 10 minutes to 2 hours in an oxidizing atmosphere to provide the tungsten trioxide powder.

2. The method according to claim 1, wherein the tungsten metal powder or the tungsten compound powder has an average particle size of 0.1 μm to 100 μm.

3. The method according to claim 1, wherein the sublimation in the oxygen atmosphere is achieved by an inductively coupled plasma process and the tungsten metal powder or the tungsten compound powder is blown into a plasma generated in the oxygen atmosphere together with a carrier gas.

4. The method according to claim 1, wherein the sublimation in the oxygen atmosphere is achieved by an inductively coupled plasma process and a dispersion in which the tungsten metal powder or the tungsten compound powder is dispersed in a liquid dispersion medium having an oxygen atom in a molecule is blown into a plasma generated in the oxygen atmosphere.

5. The method according to claim 4, wherein the liquid dispersion medium having an oxygen atom in a molecule comprises 51 vol % or more of at least one of water and alcohol.

6. A tungsten trioxide powder obtained by the method according to claim 1, wherein the tungsten trioxide powder has a BET specific surface area of 8.2 $m^2/g$ to 820 $m^2/g$ and has at least two types of crystal structures selected from the group consisting of monoclinic, orthorhombic and triclinic.

7. The tungsten trioxide powder according to claim 6, wherein the tungsten trioxide powder has a particle size distribution obtained by image analysis, (D90-D10)/D50, of 0.3 to 2.

8. The tungsten trioxide powder according to claim 6, wherein the tungsten trioxide powder has has an average particle size converted from a BET specific surface area of 1 nm to 100 nm.

9. A composition comprising 90 mass % to 100 mass % of the tungsten trioxide powder according to claim 6.

10. A photocatalyst product comprising a substrate and a photocatalyst covering layer formed on a surface of the substrate, wherein the photocatalyst covering layer is formed by binding the composition according to claim 9 with an inorganic or organic-inorganic complex binder.

11. The photocatalyst product according to claim 10, wherein the photocatalyst covering layer has a thickness of 0.1 μm to 3 μm.

12. The photocatalyst product according to claim 10, wherein the photocatalyst covering layer contains 10 vol % or more of the composition.

13. The photocatalyst product according to claim 10, wherein the photocatalyst covering layer has a transmittance of 50% or more for light having a wavelength of 550 nm.

14. The method according to claim 1, comprising subliming a tungsten metal powder.

15. The method according to claim 1, comprising subliming a tungsten compound powder.

16. The method according to claim 1, wherein the tungsten trioxide powder produced has a BET specific surface area of 8.2 $m^2/g$ to 820 $m^2/g$ and has at least two types of crystal structures selected from the group consisting of monoclinic, orthorhombic and triclinic.

17. The method according to claim 1, wherein the tungsten trioxide powder produced has a particle size distribution obtained by image analysis, (D90-D10)/D50, of 0.3 to 2.

18. The method according to claim 1, wherein the tungsten trioxide powder produced wherein the tungsten trioxide powder produced has an average particle size converted from a BET specific surface area of 1 nm to 100 nm.

19. The method according to claim 1,
wherein the tungsten trioxide powder produced has a BET specific surface area of 8.2 $m^2/g$ to 820 $m^2/g$ and has at least two types of crystal structures selected from the group consisting of monoclinic, orthorhombic and triclinic;

wherein the tungsten trioxide powder produced has a particle size distribution obtained by image analysis, (D90-D10)/D50, of 0.3 to 2; and wherein the tungsten trioxide powder produced wherein the tungsten trioxide powder produced has an average particle size converted from a BET specific surface area of 1 nm to 100 nm.

20. A method for producing a tungsten trioxide powder comprising:

subliming a tungsten metal powder or a tungsten compound powder by an inductively coupled plasma process in an oxygen atmosphere wherein a dispersion in which the tungsten metal powder or the tungsten compound powder is dispersed in a liquid dispersion medium having an oxygen atom in a molecule is blown into a plasma generated in the oxygen atmosphere to produce a tungsten trioxide powder; and heat-treating the tungsten trioxide powder at 300° C. to 1000° C. for 10 minutes to 2 hours in an oxidizing atmosphere, wherein the liquid dispersion medium having an oxygen atom in a molecule comprises 51 vol % or more of at least one alcohol selected from the group consisting of methanol, ethanol, 1-propanol and 2-propanol.

\* \* \* \* \*